April 22, 1952 J. T. WILLIAMSON 2,594,241
MEANS FOR FORMING ARTICLES SUCH AS PATTY
PANS FROM PAPER OR OTHER THIN MATERIAL
Filed July 15, 1947 4 Sheets-Sheet 1

INVENTOR
JAMES T. WILLIAMSON

April 22, 1952    J. T. WILLIAMSON    2,594,241
MEANS FOR FORMING ARTICLES SUCH AS PATTY
PANS FROM PAPER OR OTHER THIN MATERIAL
Filed July 15, 1947    4 Sheets-Sheet 2

INVENTOR
JAMES T. WILLIAMSON
By Young, Emery & Thompson Attys.

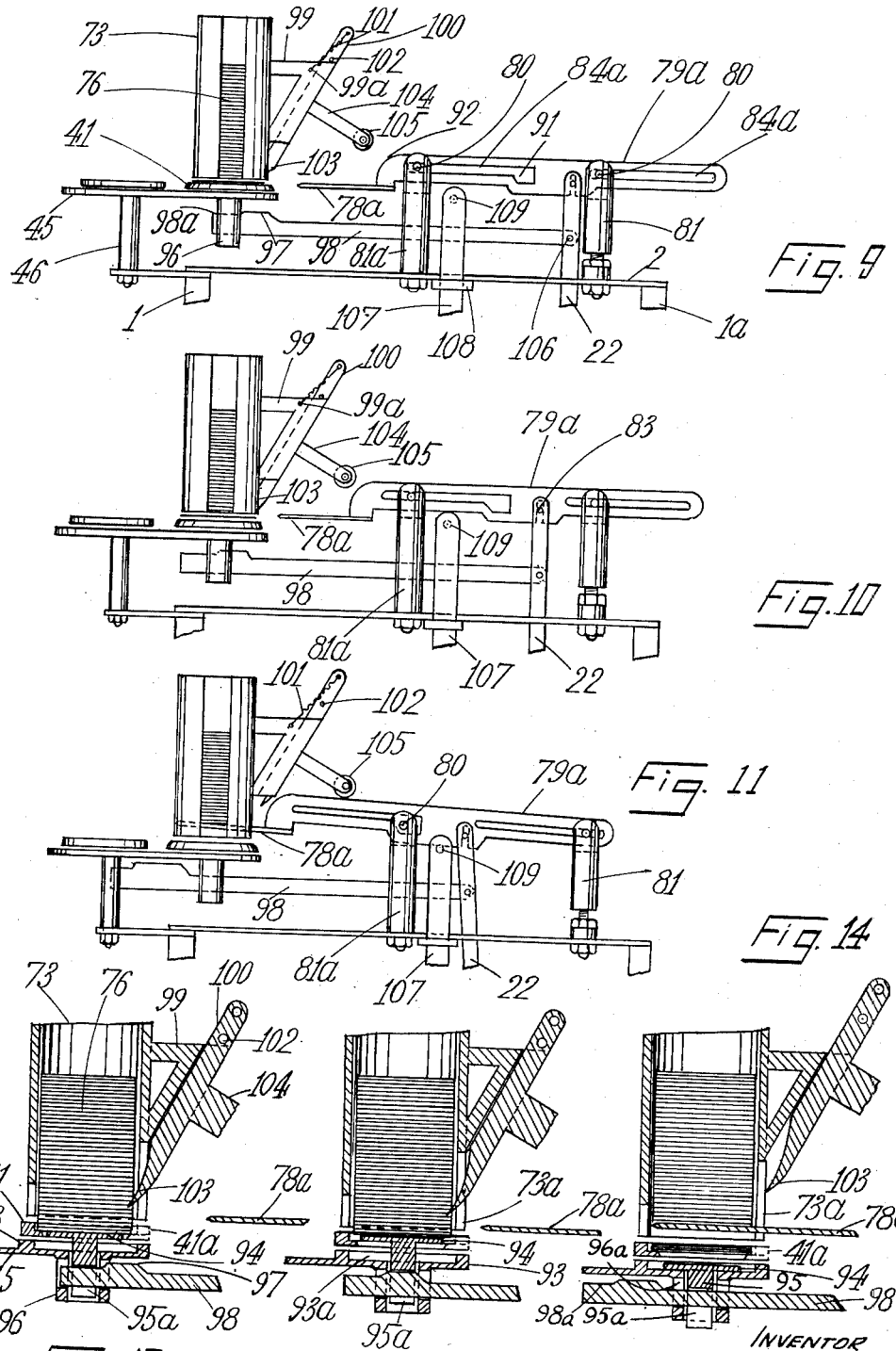

April 22, 1952 J. T. WILLIAMSON 2,594,241
MEANS FOR FORMING ARTICLES SUCH AS PATTY
PANS FROM PAPER OR OTHER THIN MATERIAL
Filed July 15, 1947 4 Sheets-Sheet 4
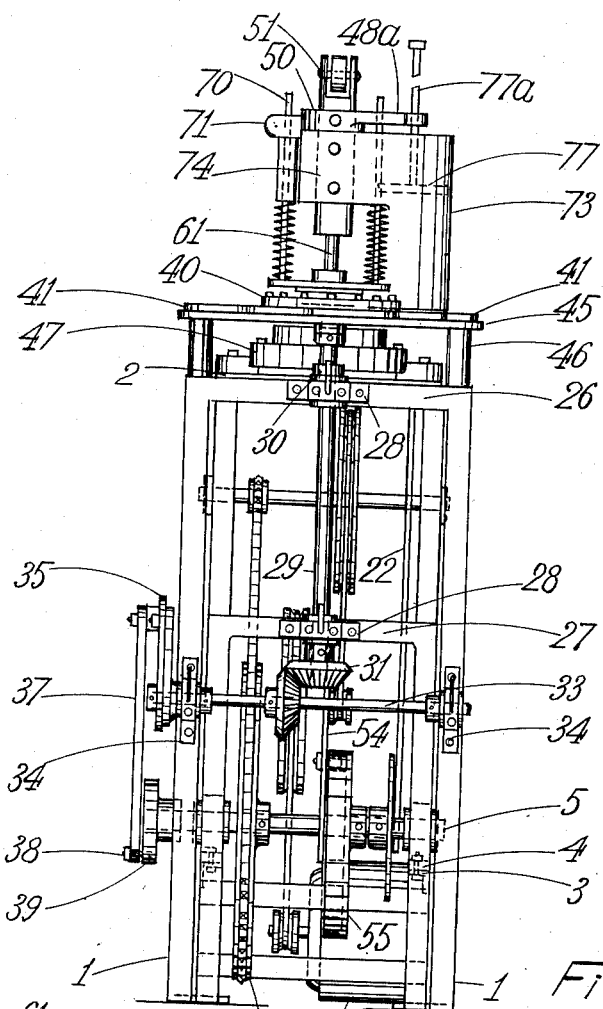
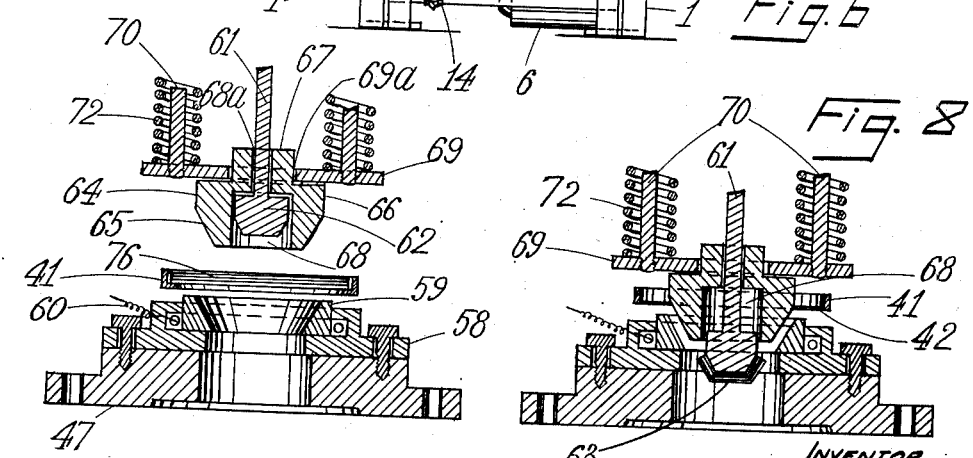
INVENTOR
JAMES T. WILLIAMSON
BY Young, Emery & Thompson Attys.

Patented Apr. 22, 1952

2,594,241

UNITED STATES PATENT OFFICE 2,594,241

MEANS FOR FORMING ARTICLES SUCH AS PATTY PANS FROM PAPER OR OTHER THIN MATERIAL

James Thomas Williamson, Dunedin, New Zealand

Application July 15, 1947, Serial No. 760,964
In New Zealand October 22, 1946

9 Claims. (Cl. 93—60)

This invention relates to methods of and means for forming articles such as patty pans from paper or other thin material, paper containers shaped as fluted patty pans for the baking of small cakes therein, being well known to the baking trade. The objects of the present invention are to provide a method of, and means for, automatically forming articles such as patty pans from paper or other thin material, whereby such articles can be produced uniformly in large quantities in a comparatively short period of time and with a minimum of manual labour.

I am aware that it is known to produce paper patty pans and the like by hand operated plunger press type machines, but these are not automatic machines and involve appreciable manual manipulation and fatigue, with the result that speed of production is slow and the produced article is liable to lack desired uniformity because of consistent care being required to avoid faults in the produced article.

Although in this specification the invention is described particularly in connection with the making of paper patty pans, it is not intended that the scope of the invention be limited to the making of these, as it is envisaged that there might well be other products which could be pressed and shaped from measured quantities of paper or other suitable sheet material in the form of stacked blanks.

The invention may be said to consist in a method of forming articles such as patty pans from paper or other thin material comprising supporting the blanks of said material in a vertical stack, separating a measured quantity of said blanks from the bottom of said stack of blanks, removing the measured quantity of blanks away from under the stack of blanks, pressing the measured and removed quantity of blanks to desired shape and delivering the press formed articles.

The invention may further be said to consist in means for forming articles such as patty pans from paper or other thin material comprising main frame means, means for supporting a vertical stack of blanks of said material, means for separating a measured quantity of blanks from the bottom of said stack of blanks, means for receiving the separated measured quantity of blanks and for conveying same away from below the stack of blanks, pressing means to which the measured quantity of blanks are conveyed for receiving and pressing same to required shape and means for delivering the press formed articles.

The invention may further be said to comprise a machine for the production of paper patty pans wherein the said machine has a loading cylinder from which a measured approximate number and thickness of paper discs are delivered to a carrying platen.

According to the invention, the said platen has intermittent movement whereby there is a period of rest under the loading cylinder and a subsequent period of rest over a die and punch pressing station.

Further, the said machine is characterised by a fluted die and punch mechanism so arranged that the punch will press the paper discs on the platen into a dished die part wherefrom they are then ejected by suitable means, the punch and die being tapered and fluted in such a fashion that the paper discs on being pressed between the punch and die are fluted and shaped as patty pans.

Further, the invention provides for electrical heating of the die part.

Still further, the invention particularly provides means for measuring the desired number and thickness in layer of paper discs in the loading cylinder to be delivered to the carrying platens, one measuring device comprising a thin knife like slice or sliding blade member which is projected horizontally through a horizontal slit or gap into the said cylinder and is thereupon moved upwards in such a manner as to raise the superimposed papers stacked above the blade member and resting thereon, the horizontal position of the blade member being determined according to the thickness of layers of the discs required to be left in the carrying platen which at that stage is stationary under the loading cylinder, the papers stacked in the cylinder being held in the raised position while the loaded carrying platen is moved from the loading station to the die pressing station.

Further, as a preferred alternative, measuring device means are provided for pressing the blanks closely together at the lower portion of the loading cylinder immediately prior to and during the entry of the sliding blade member into the stack of blanks.

In one suitable and preferred construction the carrying platens are arranged on a rotatable turntable, there being an equal radial distance from the turntable centre to the centre of each carrying platen arranged around the turntable, and to the centre of the loading cylinder, and the shaping die.

In a preferred form of the invention, the mechanism is arranged and timed so that during periods of rest in turntable rotation the carrying platens are stationary and at that time the measuring of blanks into the appropriate platen beneath the loading cylinder takes place and also the press operation by the punch and die combination takes place. During movement of carrying platens to and from the position under the loading cylinder, the sliding blade member holds the paper stacked in the loading cylinder clear above the moving platen, and on the platen coming to rest beneath the loading cylinder, the sliding blade member is withdrawn, whereupon the paper stack moves downwards in the cylinder and the lower end of the stack received into a space of the platen and is measured out to the desired depth of layer above the platen by the sliding blade member moving forward and then upward as described, the measured quantity of discs being held inside the space on the platen top while said platen is moved to the pressing station.

The drawings herewith show the invention having nine carrying platens with appropriate timing mechanism, but it will be obvious that the number of platens may be varied.

In describing the invention reference will be made to the accompanying drawings in which.

Figures 4, 5:
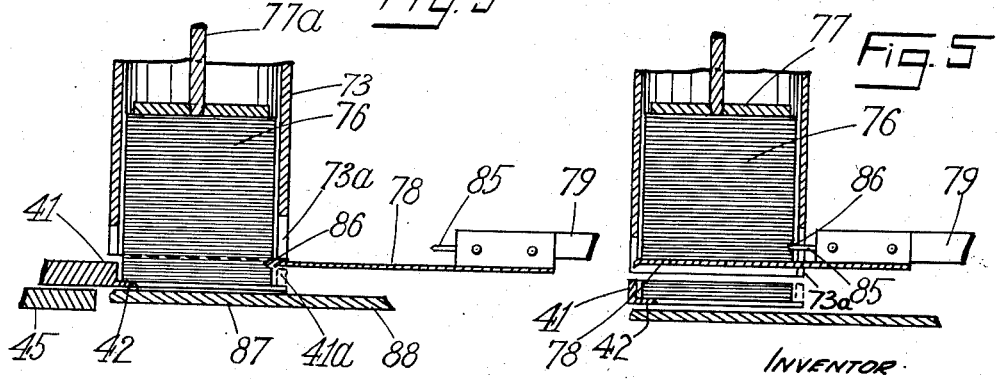
Figure 4 is an enlarged sectional elevation through the lower part of the loading cylinder with the blade member commencing its forward movement into the stack of blanks.

Figure 5 is a similar view to that of Figure 4 but with the blade member at its forward and raised position, Figure 6 is a front elevation of the machine, Figure 7 is an enlarged cross sectional elevation through the punch and die parts, with the punch raised, Figure 8 is a similar view to that of Figure 7 but with the punch lowered into the die and the paper pans being ejected, Figure 9 is an enlarged view of a loading cylinder with alternative and modified sliding blade mechanism applied thereto, in which the blade member is at position of maximum withdrawal from the loading cylinder, Figure 10 is a similar view to that of Figure 9 but with the point of the blade about to enter the cylinder, Figure 11 is a similar view to that of Figure 9 but with the blade at the position of maximum entry to the loading cylinder, Figure 12 is an enlarged sectional view of a loading cylinder with the point of the blade member positioned as shown in Figure 9, Figure 13 is a similar view with the point of the blade position as in Figure 10 and Figure 14 is a further similar view with the blade in position as shown in Figure 11.

In the invention, the machine comprises a framework composed of front and back pairs of legs 1 and 1a supporting at the top thereof a table top 2, suitable crossbars 3 connecting the front and back legs 1 and 1a on each side of the machine, said crossbars 3 having suitable bearings 4 mounted thereto for rotatably carrying a motion shaft 5.

Any suitable power drive is provided for the motion shaft 5 which requires a substantially slow speed of rotation, the preferred drive being obtained from an electric motor 6 mounted to the back legs 1a with any suitable known reduction gear means between the motor 6 and the motion shaft 5.

Such known reduction gear in accordance with the drawings, may comprise first and second countershafts 9 and 10 carried by suitable bearings 11 mounted on the back legs 1a, the countershaft 9 carrying a large pulley 7 for receiving a belt drive 8 from the motor 6, a similar large pulley 7 on the countershaft 10 receiving belt drive from a small pulley on the shaft 9, the second countershaft 10 carrying a sprocket 12 over which a chain 13 passes on to a sprocket wheel 14 which is secured to the motion shaft 5.

A pusher cam 15 (see Figure 1) is mounted on the motion shaft 5 close to the crossbar 3 on the right hand side of the machine, a roller 16 mounted on a horizontal cam rod 17 bearing on this cam 15, the cam rod 17 being slidably mounted in a bearing block 18 secured to the neighbouring leg 1a, the front end of the cam rod 17, (beyond the position at which the roller 16 is mounted) being of forked form 19 for straddling a collar (not shown) which is freely carried on the motion shaft 5 in a manner commonly known to the art, a tension spring 20 connecting the forked end 19 with a front leg 1 so as to tend to keep the roller 16 in constant contact with the cam 15.

The cam 15 is so shaped that during one revolution thereof, the cam rod 17 is held at an inwards position with the roller 16 near the motion shaft 5 for a continuous period, and then the roller 16 and cam rod 17 is moved quickly to an outward position away from the motion shaft 5 and is there held for a period at the end of which the cam rod 17 and roller 16 move quickly to the inwards position under the influence of the spring 20.

A pin 21 on the cam rod 17 (see Figure 1) is slidably accommodated in a short vertical rocking lever 22 pivotally mounted on a pivot pin 23 (or like) which projects from a crossbar 24 joining the front and back legs 1 and 1a, the rocking lever 22 projecting through the table top 2 by way of a slot 25 therein (see Figure 2) to be connected to a sliding motion bar hereinafter referred to.

At the front of the machine framework a top crossbar 26 (see Figure 6) disposed below the table top 2 joins the two front legs 1, a lower crossbar 27 also joining these legs 1 at about the same level as the side crossbar 24, bearings 28 being mounted at the centre position of the crossbars 26 and 27 and a vertical rotatable spindle 29 carried in said bearings 28 and held in position by a collar 30, the lower end of the vertical spindle 29 having a bevel pinion 31 secured thereof for meshing with a bevel pinion 32 secured on a horizontal spindle 33 which is rotatably carried by bearings 34 secured to the two front legs 1.

A ratchet wheel 36 is mounted on the projecting end of the spindle 33 (see Figure 3) and associated with this there is a rocker arm 35a with pawl 35 adapted for pivotal movement on the spindle 33, a connecting rod 37 being pivotally connected at one end to the rocker arm 35a, its other end being carried by a crank pin 38 on a crank 39 mounted on the end of the motion shaft 5 projecting to the left hand side of the machine, this mechanism giving intermittent motion with periods of rest to the horizontal spindle 33 and the vertical spindle 29, the number of teeth in the ratchet wheel 36 being the same as the number of carrying platens on the turntable to be described.

On the upper end of the vertical spindle 29 is secured a turntable in the form of a circular plate 40, carrying rings or platens 41 (see Figure 2) being secured to the circular plate 40 to extend radially therefrom, these platens 41 of ring shape having internal base flanges 42 (see Figure 8) the depth of the insides of the rings 41 approximating the depth of the layers of paper to be metered for forming into the pans, or of slightly greater depth.

In one construction using paper discs approximately 3½ inches in diameter, the internal depth of the rings or platens 41 above the base flanges 42 was ⅛ inch, said base flanges projecting as internal rims ⅛ inch wide.

Arms 43 (see Figure 2) project inwards from each of the rings or platens 41 to pass under the circular plate 40 and to be attached thereto by setscrews or the like 44.

A plate 45 (see Figure 1) is rigidly mounted on posts 46 extending up from the tops of the two front legs 1 and is positioned under the carrying platens 41 except that portion of the plate 45 under the loading cylinder is cut away, this plate 45 also being cut away around the die bolster, but not being essential to the working of the machine as being for safety purposes to prevent the operative's fingers being passed downwards through the moving platens 41 with risk of injury.

Figure 2:
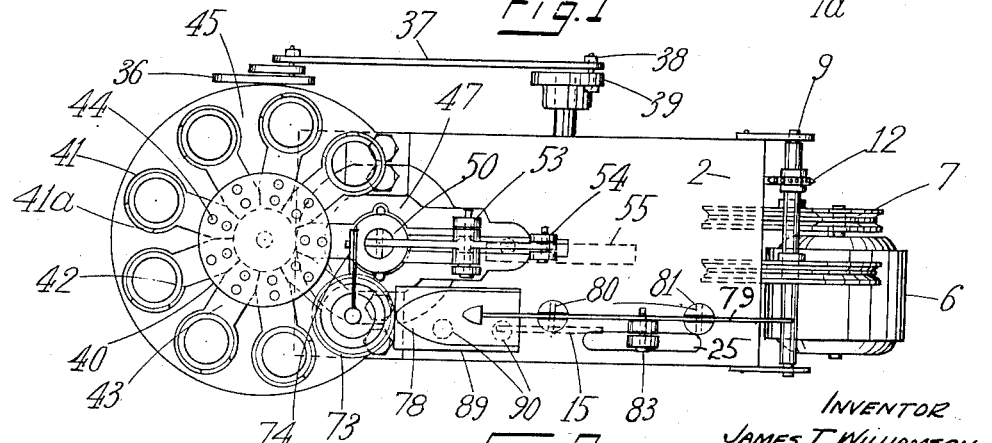
Figure 2 is a plan view of Figure 1.

The sides of the rings or platens 41 have gaps 41a therein as shown in Figures 2 and 4 to provide spaces for the entry into the rings 41 of a moving blade member when required, to be hereinafter described.

The press mechanism comprises (see Figures 1 and 3) a casting in the form of a bolster 47, a base 48, a vertical post 49 and a guide boss 50 (see Figure 1) the bolster 47 being in effect a part of the base 48 which is secured to the table top 2 in suitable manner, the bolster 47 being machined to mount a press die the centre of which will coincide with the centre of one of the carrying platens 41 arranged to overlie the die when at that station.

Figure 3:
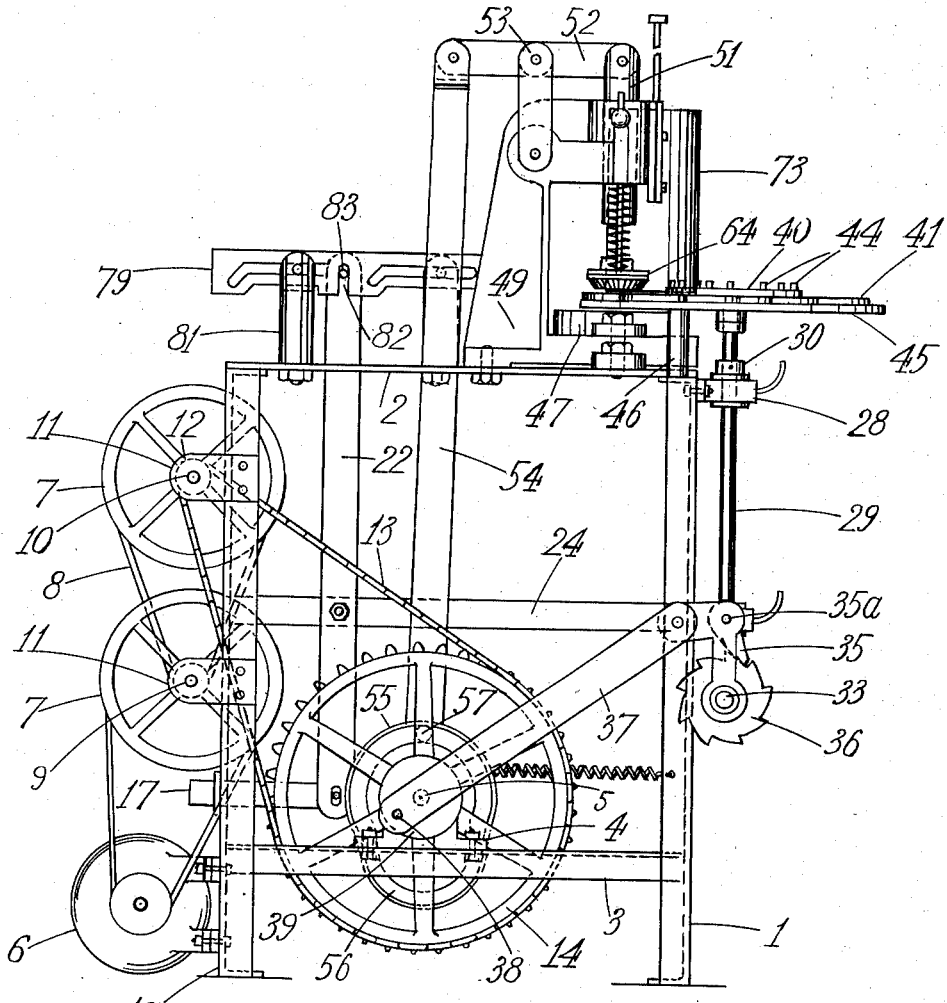
Figure 3 is a side elevation of the machine as viewed from the left.

Projecting forward from the top of the post 49 is located the boss 50 which has a vertical bore machined therein for the vertically slidable plunger 51 which receives intermittent movement with periods of rest as being actuated by a rocker arm 52 (see Figure 3) pivoted on links 53 carried on the post 49, one end of the rocker arm 52 being connected to the plunger 51 and the other end connected to the push rod 54 which receives its intermittent vertical movement with rest periods from a press cam 55 mounted on the motion shaft 5, this cam 55 (as shown in Figure 3) having a groove 56 in a side thereof for accommodating a roller 57 on the push rod 54, the cam 55 and its groove 56 being shaped to give one up and down stroke to the push rod 54 during each revolution of the motion shaft 5.

A die block 58 (see Figures 7 and 8) is mounted on the bolster 47 and is machined at its centre to accommodate a die 59, said die 59 being fluted and tapered inwards to suit the shape of the paper patty pans or other articles to be produced in the pressing operation, an electric element 60 for die heating purposes being provided if so desired.

A rod 61 is secured to and projects downward from the plunger 51 (see Figure 7) and a circular ejector block 62 is carried on the end of this rod 61 inside the punch 64, it being preferred that the bottom edges of this ejector block 62 be fluted so as to coincide with the flutes on the inside of the nest of patty pans 63 when pressed and so avoid flattening or otherwise spoiling the flutes pressed up on the paper, when ejecting same through the die 59 and bolster 47 and through a hole in the table 2 concentrically below these (not shown).

A punch 64 is of tapered shape 65 and fluted to suit the inside of the nest of paper patty pans, portion of the punch 64 above the taper 65 being continued as a parallel cylinder 66 terminating in a boss 67 of reduced diameter said punch 64 on its bottom face being hollowed as an axially central recess 68, of a depth greater than the depth of the ejector block 62 which is accommodated in the said recess 68, an axial hole 68a passing upward from the recess 68 to the top of the punch 64 to permit free passage of the rod 61 carrying the ejector block 62.

A plate 69 crosses the punch and lies on top thereof, a hole 69a in the centre of the plate 69 permitting the passage of the boss 67, and at opposite ends of this plate 69 there are secured vertical rods 70 which project upwards to pass through holes in lugs 71 on each side of the boss 50 of the main base casting 48, spiral compression springs 72 on each of the rods 70 tending to push them and the punch 64 hard down on to the ejector block 62.

In the constructional adaptation of loading cylinder and associated parts as shown in Figures 4 and 5 of the drawings, there is a cylinder 73 made of tubing or the like, held in position on the main base 48 by being provided with a rib 74 (see Figure 6) secured by screws of the like to the front of the boss 50, part of the cylinder side being preferably removed to present a slot 75 (see Figure 1) so that the paper blanks 76 stacked inside the cylinder 73 can be readily reached by the operator's fingers if so desired.

As before stated, this cylinder 73 overlies the carrying platen 41 which is at the station of rest immediately before the punch and die station, the bottom of the cylinder 73 being just clear of the top of the platens 41 moving beneath same, a weight 77 preferably being provided to rest on the top of the stack of paper blanks 76 to keep them packed together, such weight 77 being on the bottom end of a rod 77a which is freely vertically slidable within a boss extension 48a of the base 48.

A thin blade 78 (see Figures 4 and 5) of preferably steel and having a pointed entering end preferably slightly bent downward, is adapted to move forward horizontally at appropriate times, being so positioned as to enter the stack of paper blanks near to the top of a ring 41 of the circle of rings or platens, or in such position above the level of the floor or flanges 42 of the rings or platens 41 as to meter or measure the thickness of papers required to be carried forward by the ring 41 in its movement to the punch and die station, there being a gap 73a in the wall of the cylinder 73 for the passage therethrough of the blade 78.

A sliding motion plate to be described, gives a vertical lift to the blade 78 after it has entered the stack of blanks and in this manner the blade 78 holds the paper stack clear of the carrying platens 41 when they are moving, and when an empty platen 41 is positioned under the loading cylinder 73, the blade 78 is lowered and withdrawn.

The mechanism to operate the blade 78 comprises a motion bar 79 (see Figure 1) made preferably of flat steel disposed on edge to slide on pins 80 in the forked top ends of two posts 81 and 81a which are mounted on the top of the table 2.

Figure 1:
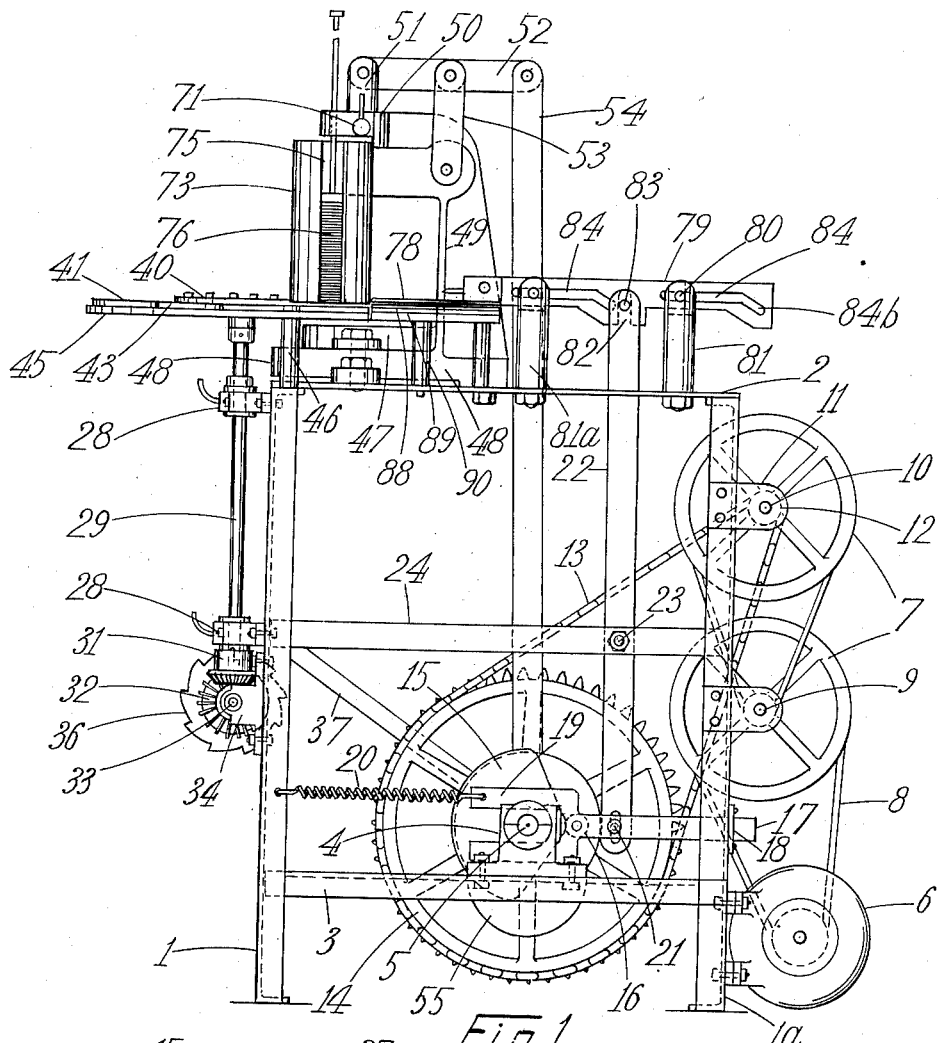
Figure 1 is a side elevation of the machine as viewed from the right.

There is a notch 82 on the under edge of the bar 79, a motion pin 83 on the top of the rocking lever 22 being slidably accommodated in this notch 82, the purpose of such notch 82 being to permit required vertical movement of the motion bar 79 without disengagement from the motion pin 83, said motion bar 79 also being slotted by two lengthwise slots 84 at each side of the notch 82, these slots 84 at their back ends being inclined downwards 84b as shown in Figure 1.

By this arrangement, forward travel of the rocking lever 22 will project the motion bar 79 forward with the latter riding horizontally on the pins 80 engaged in the slots 84, but when the inclined ends 84b of the slots 84 pass over the pins 80, the motion bar 79 is raised vertically, the movements of the motion bar 79 being reversed on return swing of the rocking lever 22.

The blade 78 previously mentioned is attached to the front of the motion bar 79 by screws, rivets or other suitable means, a calipering blade 85 (see Figures 4 and 5) also being fitted to the motion bar 79 above the sliding blade 78 and so positioned as to enter the edge of the paper stack and make an indent 86 (see Figure 5) therein at a place which will be the point of entry for the blade 78 in the next operation.

As before stated, the plate 45 under the carrying platens 41 does not extend under the loading cylinder 73, a preferably brass plate 87 being provided (see Figures 4 and 5) under the loading cylinder 73 secured as an extension of an arm 88 held between steel securing plates 89 on the top of posts 90 on the table top 2 (see Figure 1).

In the modified and preferred form of mechanism for the metering of the blanks to the platens 41 (see Figures 9 to 14) the vertical rocking lever 22 actuates a motion bar 79a disposed on edge to slide on pins 80 in the forked tops of posts 81 and 81a mounted on the table top 2, positioned substantially the same as previously, the back post 81 being preferably made adjustable as to height as shown, said motion bar 79a being engaged with the rocking lever 22 in like manner to the motion bar 79 previously described, such motion bar 79a also having two lengthwise slots 84a slidably engaged on pins 80 of the posts 81 and 81a, one slot 84a having its rear end enlarged downwards 91 as shown in Figure 9.

The front end of this motion bar 79a is rounded to provide a cam face 92 which is adapted for being contacted by a pinching finger roller to be described.

A flat blade member 78a is mounted to project forward from the motion bar towards the loading cylinder 73 which is similar to previously described with gaps 73a at its lower end to permit entry of the sliding blade 78a and the point of a pinching finger to be described.

The carrying rings or platens 41 which pass under the loading cylinder 73 are associated with modified mechanism, a base ring 93 being secured on the plate 45 of the machine, such base ring 93 being disposed permanently under the loading cylinder 73 and below the path of the platens 41 and has a recess 93a in its upper face to accommodate a lifting plate 94 which has a dependent stem 95a moving slidably in a tubular boss 96 disposed on the underside of the base ring 93, the boss 96 (see Figure 12) permitting slidable passage therethrough of the lifting face end 97 of a cam bar 98, such cam bar preferably comprising a bar of flat steel set on edge and resting on the bottom of the slot 96a in the boss 96 (see Figure 14) the stem 95 of the lifting plate 94 resting on the top edge of the cam bar 98.

The positional height of the lifting plate 94 is regulated by the height of the top edge of the cam bar 98 and its lifting face 97, the bearing of the lifting plate stem 95 on such lifting face 97 raising the plate 94 to its maximum height whereat the paper on such plate 94 is pressed upwards against the downward inclination of the pinching finger.

The blade member 78a which extends from the cam end 92 of the motion bar 79a, enters the paper stack in the loading cylinder 73 between the pinching finger and the lifting plate 94 and meters out a determined thickness of paper blanks 76 resting on the lifting plate 94 when same is in its position of maximum height as shown in Figure 10.

The cam rod 98 is slightly lower towards the outer end 98a thereof relative to the height of the lifting face 97 so that the lifting plate 94 is raised just slightly below its maximum height as shown in Figure 9 at the time when the blade member 78a is totally withdrawn from the loading cylinder 73. When the lifting face 97 has passed through the slot 95a in the stem 95 as shown in Figure 14, the top edge of the cam rod 98 is so reduced in height that the said lifting plate 94 rests on the base ring 93 within the recess 93a of the latter and is at its lowest point of travel.

Pinching finger mechanism applied to the loading cylinder 73 functions to press the edges of a number of paper blanks downwards on to the lifting plate 94 when same is in the raised position, this function of the pinching finger and the lifting plate 94 ensuring a firmly packed lower part of the stack of blanks 76 into which the blade member 78a can enter to measure off a desired and consistent number between the lifting plate 94 and the under side of the blade member 78a, In the preferred form of pinching finger as shown in Figures 9 to 14, there is a bracket 99 secured on the side of the loading cylinder 73, the inclined edge of the bracket 99 having a groove, slot or like (not shown) for slidably carrying the finger bar 100, a coiled tension spring 101 connecting the finger bar 100 to a pin 99a on the bracket 99 and tending to draw the finger bar 100 downwards in the groove in the bracket edge, a stop pin 102 or the like being provided to limit the downward movement of the finger bar 100.

The lower end of this finger bar 100 is sharpened to present a pinching finger or pressing point 103 suitably shaped to enter between the edges of the blanks in the cylinder 73 and press the edges below the finger 103 firmly downwards under the influence of the tension spring 101, a cam arm 104 attached to or integral with the finger bar 100 projecting outwardly therefrom, the end of the cam arm 104 revolvably carrying a cam roller 105.

The cam arm 104 and cam roller 105 are so positioned and arranged that they provide means whereby the finger bar 100 can be elevated in the bracket 99, and consequently the pinching finger 103 be lifted free of any engagement with the blanks inside the cylinder 73.

Normally when the motion bar 79a is withdrawn as shown in Figure 9, the cam arm 104 and its roller 105 are so disposed that the roller 105 is out of contact with the motion bar 79a, but when said motion bar 79a has moved forward such a distance that the point of the sliding blade 78a has entered the stack of blanks pressed together as described, then the roller 105 is so disposed as to make contact with the cam face 92 in the front of the motion bar 79a, further inward movement of such motion bar 79a causing the roller 105 to ride up the cam face 92 and to rest on to top edge of the motion bar 79a, whereby the finger bar 100 is raised and the pinching finger 103 withdrawn from contact with the blanks inside the loading cylinder 73.

In repeated operations when the sliding plate 78a is effectively entered between the blanks 76 inside the loading cylinder 73, it is found that a substantially consistent number of blanks has been measured out between the lifting plate 94 and the under side of the said blade 78a.

With the sliding blade 78a in the entered position the cam bar 97 is moved horizontally, this being effected by means to be described, and as the sliding blade 78a passes to its innermost position inside the loading cylinder 73, it is raised upwards so that there is no possibility of the blanks remaining within the cylinder from making any interfering contact with the carrying ring 41 when same is moved from the loading station to the pressing station.

The sliding blade 78a and the cam rod 98 are moved horizontally by the movement of the rocking lever 22, and the end of the cam rod 98 is pivotally connected to the rocking lever 22 by a pin 106 positioned below the lower edge of the motion bar 79a.

The motion bar 79a is moved upwards when desired in the cycle of operations by the functioning of a lifting lever 107, this lever 107 (see Figure 9) being mounted in a guide block 108 on the table top 2 and having an intermittent upward movement of the desired amount controlled and operated by suitable lifting cam, eccentric, or other known form of suitable mechanism (not shown) provided on the motion shaft 5 of the machine, a lifting pin 109 or the like projecting from the lifting lever 107 and being normally disposed a short distance below the motion bar 79a out of contact therewith and close to the front post 81a, but when the lifting lever 107 moves upward, the lifting pin 109 bears against the under edge of the motion bar 79a so that still further upward movement of the lever 107 raises the motion bar 79a and the attached sliding blade 78a, the motion bar 79a rising pivotally on the pin 80 of the back post 81, relative movement being adjustably obtained by adjustment of the height of the pin 80 on its post 81, the enlarged part 91 of the slot 84a permitting upward movement of the bar on the pin 80 as shown in Figure 11.

In use or operation and considering the apparatus of Figures 1 to 8 of the drawings, rotation of the motion shaft 5 and the movements of the various moving parts is so coordinated and timed that the movements following each other in proper order continuously as long as the power drive is imparted to the machine, the shape and timing of the two cams 15 and 55 being important elements in co-ordinating the cycles of operation.

Paper blanks 76 cut to the required size are stacked in the loading cylinder 73 so as to rest on the floor or rim presented by the flanges 42 in the platen rings 41 one of which will be directly under the loading cylinder 73, and as already described the blade member 78 of Figures 4 and 5 measures the depth of blanks 76 to be deposited on to the carrying platen 41 and raises the remainder, the paper blanks being carried from below the cylinder 73 to a position over the die 59 by the periodic movement of the turntable or circular plate 40.

The plunger 51 and ejector rod 61 of the press mechanism is moved downwards by the appropriate movement of the press cam 55 and push rod 54, the punch 64 being carried along with the descending ejector block 62 by the pressure of the compression springs 72 until the paper blanks 76 are gripped between the punch 64 and the die 59 and are thereby forced into required shape, the punch 64 being held in position inside the die 59 while the ejector rod 61 and block 62 move still further downwards to thereby push the pans 63 right through the centre of the die 59 as shown in Figure 8.

The press cam 55 in its rotation then causes the ejector block 62 to be raised and lifts the punch 64 and the ejector 62 together to the raised position of rest.

The paper blanks 76 may be damped and the die 59 may be heated by the electric element 60 if so desired according to the practice already known to the art.

The operation of the alternative mechanism as shown in Figures 9 to 14 varies from that described, the introduction of the extra mechanism giving improved accuracy in the number of blanks deposited on to the platens 41, the blanks 76 loaded into the cylinder 73 being placed therein when the sliding blade 78a is totally withdrawn, with one of the platen rings 41 located under the cylinder 73 so that the said blanks 76 thus rest on the lifting plate 94 inside the ring 41 as shown in Figure 12, the blanks settling down naturally onto the plate 94, the finger bar 100 being raised by hand to permit the blanks to settle and then such finger bar 100 being released so that the pinching finger 103 presses on to the blank edges (see Figure 12).

Operation of the machine causes the sliding blade 78a to enter the gap 41a in the ring 41 and the gap 73a in the cylinder 73 to measure off a determined quantity of blanks 76 on to the lifting plate 94 and therefrom on to the ring 41 on lowering of the lifting plate 94 (see Figure 14).

The blade 78a is then raised and the ring 41 carries the metered blanks to the press and die station to be pressed into required shape.

The movements of the parts of the mechanism are so timed and co-ordinated that there is a regular cycle of the operations, such operations in order as they influence the blanks comprising the pinching of the edges of the blanks 76 within the loading cylinder 73, the entry of the blade 78a, the release of the pinching finger 103, the movements of the cam bar 98 to cause falling of the lifting plate 94, the lowering of the blanks on to the platen ring 41 concurrently with the raising of the sliding blade 78a and the moving of the platen ring 41 to the press and die station where pressing of the blanks is effected and from which the patty pans are discharged from the machine.

I claim:

1. Apparatus for forming articles such as patty pans from paper or other thin material blanks comprising a framework composed of front and back legs supporting a table top, a main motion shaft mounted in bearings on the frame below the table top, an electric motor and reduction gear on the frame for driving the main motion shaft, a grooved press cam on said motion shaft with the roller at the bottom end of a push rod engaged in the groove thereof, a rocker arm connecting the top end of the push rod to a slidable plunger of a press base and post casting mounted on the table top, a bolster and die block mounted over a hole in the table top concentrically below the slidable plunger, a punch engaged in a plate which is secured to two vertical rods which are slidable within lugs of the press base and post casting, compression springs over these rods, an ejector block housed within a recess of the punch and connected by a rod to the slidable plunger, a crank and crank pin on the end of the main motion shaft with a connecting rod extending between the crank pin and a rocker arm pivoted on a horizontal spindle mounted in bearings on the framework, a pawl on said rocker arm engaging a ratchet wheel secured to said horizontal spindle, a bevel pinion on said spindle meshing with a bevel pinion on a vertical shaft mounted in bearings on the framework, a turntable secured at the top end of said vertical shaft to which platens are secured, a pusher cam mounted on the motion shaft and engaging the roller of a cam rod which has a forked end straddling the shaft and connected by a tension spring to the main framework, a vertical rocking lever pivoted between its ends to the framework and connected to the cam rod at its lower end, a motion bar engaged by the top end of the rocking lever, said motion bar being carried by pins on posts secured to the table top engaged through slots in said bar, a sliding blade and cam face at one end of the motion bar, a plate mounted on posts secured to the table top, a base ring to said plate with recess therein and boss thereunder, a lifting plate vertically movable in said base ring by a stem thereof extending through the boss of said base ring, a cam bar engageable at its lifting face end through slots in the base ring boss and in the stem of the lifting plate with its other end connected to the rocking lever, a lifting lever on the main motion shaft with a lifting pin at its upper end engageable with the motion bar, a loading cylinder mounted to the press and post casting, a slidable weight within the loading cylinder, a bracket to said loading cylinder carrying a finger bar with pinching finger, a tension spring between said finger bar and the bracket, and a cam arm with roller to said finger bar.

2. Apparatus for forming articles such as patty pans from paper or other thin material blanks, comprising a main frame, means on the frame for supporting a substantially vertical stack of blanks, means for intermittently compressing blanks in the lower part of the stack, means mounted on the frame for separating a measured quantity of the compressed blanks at the lower part of said stack by lifting the upper part of the stack clear of the measured quantity, and for releasing the said upper part of the stack when the measured quantity is removed, means for receiving the separated measured quantity of blanks and for conveying same away from the lower part of the stack, pressing means on the frame to which the measured quantity of blanks are conveyed for pressing same to required shape, and means for delivering the press formed articles.

3. Apparatus for forming articles such as patty pans, according to claim 2, wherein the means for separating a measured quantity of blanks comprises a slidable motion bar with a blade projecting from an end thereof towards the lower portion of a cylinder for the blanks and oscillatable into position among the blanks below said cylinder and away from said position, a cam at the blade end of such motion bar, a plate secured to the machine with a base ring extending under the cylinder, a lifting plate below the cylinder and with a stem by which it is mounted to the base ring for vertical motion therein, a boss below the base ring, slots in the boss and in the stem of the lifting plate through which the lifting face end of a cam bar extends, means for causing oscillatory sliding movements of the cam bar, means to cause inward movements of the blade to among the blanks below the cylinder, lifting movements while among the blanks and withdrawal movements from said blanks, the means for compressing blanks in the lower part of the stack comprising pinching finger means on said cylinder for compressing the blanks at the lower portion thereof prior to entry of the blade thereto, means on the pinching finger means and coacting with the cam at the blade end of the motion bar to lift the pinching finger means, and spring means to depress the pinching finger means.

4. Apparatus for forming articles such as patty pans according to claim 2, wherein the means for separating a measured quantity of blanks comprises a slidable motion bar with a blade projecting from an end thereof towards the lower portion of a cylinder for the blanks and oscillatable into position among the blanks below said cylinder and away from said position, a cam at the blade end of such motion bar, a plate secured to the machine with a base ring extending under the cylinder, a lifting plate below the cylinder and with a stem by which it is mounted to the base ring for vertical motion therein, a boss below the base ring, slots in the boss and in the stem of the lifting plate through which the lifting face end of a cam bar extends, means for causing oscillatory sliding movements of the cam bar, means to cause inward movements of the blade to among the blanks below the cylinder, lifting movements while among the blanks and withdrawal movements from said blanks, the means for compressing blanks in the lower part of the stack comprising pinching finger means on said cylinder for compressing the blanks at the lower portion thereof prior to entry of the blade thereto, means on the pinching finger means and coacting with the cam at the blade end of the motion bar to lift the pinching finger means, and spring means to depress the pinching finger means, the means for causing the movements of the motion bar and its attached blade comprising pins on the top ends of posts mounted on the machine and engaged through slots in the motion bar, there being an enlarged end to one of said slots, a notch in the under edge of the motion bar engaged by a motion pin disposed at the top end of a vertical rocking lever which is pivoted between its ends to the machine frame, the bottom end of such rocking lever being pivotally connected to a cam rod which is actuated by cam means mounted on a motion shaft of the machine, and a lifting lever connected at its lower end by a lifting element to the said motion shaft, the upper end of such lifting lever extending upwards and having a lifting pin for bearing under the motion bar and lifting it as required.

5. Apparatus for forming articles such as patty pans according to claim 2, wherein the means for separating a measured quantity of blanks comprises a slidable motion bar with a blade projecting from an end thereof towards the lower portion of a cylinder for the blanks and oscillatable into position among the blanks below said cylinder and away from said position, a cam at the blade end of such motion bar, a plate secured to the machine with a base ring extending under the cylinder, a lifting plate below the cylinder and with a stem by which it is mounted to the base ring for vertical motion therein, a boss below the base ring, slots in the boss and in the stem of the lifting plate through which the lifting face end of a cam bar extends, means for causing oscillatory sliding movements of the cam bar, means to cause inward movements of the blade to among the blanks below the cylinder, lifting movements while among the blanks and withdrawal movements from said blanks, the means for compressing blanks in the lower part of the stack comprising pinching finger means on said cylinder for compressing the blanks at the lower portion thereof prior to entry of the blade thereto, means on the pinching finger means and coacting with the cam at the blade end of the motion bar to lift the pinching finger means, and spring means to depress the pinching finger means, the means for causing the movements of the motion bar and its attached blade comprising pins on the top ends of posts mounted on the machine and engaged through slots in the motion bar, there being an enlarged end to one of said slots, a notch in the under edge of the motion bar engaged by a motion pin disposed at the top end of a vertical rocking lever which is pivoted between its ends to the machine frame, the bottom end of such rocking lever being pivotally connected to a cam rod which is actuated by cam means mounted on a motion shaft of the machine, and a lifting lever connected at its lower end by a lifting element to the said motion shaft, the upper end of such lifting lever extending upwards and having a lifting pin for bearing under the motion bar and lifting it as required, the means for causing the oscillatory sliding movements of the cam bar comprising the connection of same to the vertical rocking lever at a position closely below the top thereof.

6. Apparatus for forming articles such as patty pans from paper or other thin material blanks, comprising a main frame, means on the frame for supporting a substantially vertical stack of blanks, means for intermittently compressing blanks in the lower part of the stack, means mounted on the frame for separating a measured quantity of the compressed blanks at the lower part of said stack by lifting the upper part of the stack clear of the measured quantity, and for releasing the said upper part of the stack when the measured quantity is removed, means for receiving the separated measured quantity of blanks and for conveying same away from the lower part of the stack, pressing means on the frame to which the measured quantity of blanks are conveyed for pressing same to required shape, and means for delivering the press formed articles, the means for compressing blanks in the lower part of the stack comprising a bracket secured to a loading cylinder or container for the blanks and forming an inclined guide in which a finger bar is slidable to project a pinching finger at the lower end thereof through a slot of the cylinder to operative position within said cylinder, spring means tending to hold said finger bar with the finger projected into the cylinder and a cam arm secured to the finger bar end at the outer end of which a roller is disposed adapted at times to be engaged by the cam end of the motion bar to lift the finger bar to retract the pinching finger.

7. Apparatus for forming articles such as patty pans, according to claim 2, wherein the means for receiving the separated measured quantity of blanks and for conveying the same away from the lower part of the stack comprise a turntable, platens in a concentric pitch circle thereon for receiving the separated measured quantity of blanks, means for intermittently driving the turntable to convey the separated measured quantity of blanks from the stack to the pressing means, and apertures in the plantens so that the separated measured quantity of blanks can be pushed through the apertures by the pressing means.

8. Apparatus for forming articles such as patty pans, according to claim 2, wherein the pressing means comprise a shaped die below the platens at the pressing position, the die having a central aperture, and a shaped punch adapted to push the separated measured quantity of blanks downwards through the openings in the platens into the die, the means for delivering the press-formed articles comprising an ejector block associated with the punch and adapted after formation of the press-formed articles to eject the same downwards through the central die aperture.

9. Apparatus for forming articles such as patty pans, as claimed in claim 2, wherein the means for compressing blanks in the lower part of the stack include means for applying pressure to the said blanks from above and lifting means below the stack for applying upward pressure to the said blanks and actuating means for the lifting means so designed that the said lifting means will drop after entry of a blade for separating the measured quantity of the compressed blanks, to allow the measured quantity to fall away from the upper part of the stack.

JAMES THOMAS WILLIAMSON.

REFERENCES CITED

The following references are of record in the file of this patent:

UNITED STATES PATENTS

| Number | Name | Date |
|---|---|---|
| 1,011,787 | Hines | Dec. 12, 1911 |
| 1,323,632 | Harvey | Dec. 12, 1919 |
| 1,504,245 | Huntley | Aug. 12, 1924 |
| 2,325,161 | Goodwin et al. | July 27, 1943 |
| 2,336,499 | Murch et al. | Dec. 14, 1943 |

FOREIGN PATENTS

| Number | Country | Date |
|---|---|---|
| 477,935 | Germany | June 15, 1929 |
| 461,967 | Germany | June 30, 1928 |
| 169,840 | Great Britain | Oct. 12, 1921 |
| 11,220 | Great Britain | 1909 |